J. R. BRESEE.
Gate.
No. 60,678.
Patented Jan. 1, 1867.
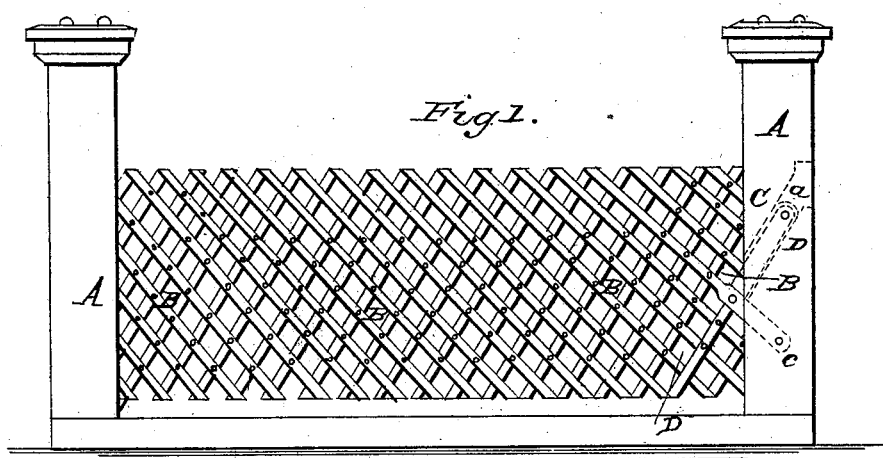
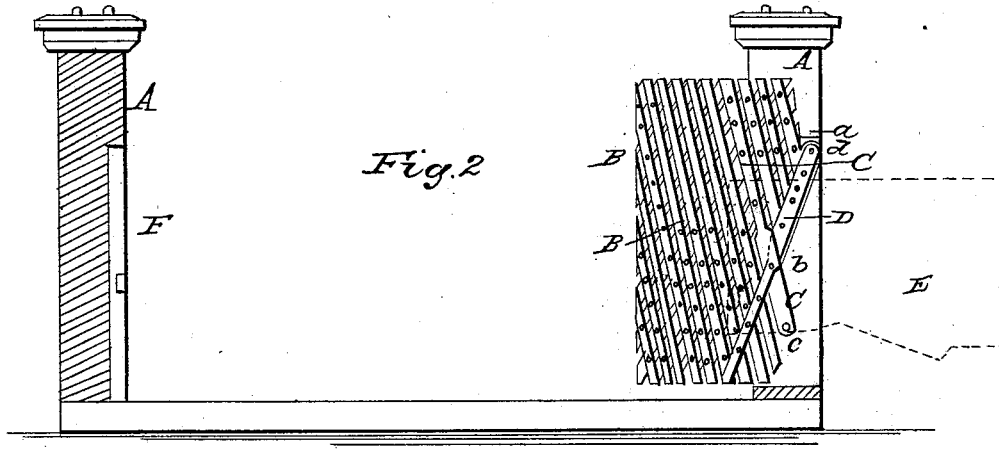
Witnesses
William E. Mans
L. Coburn
Inventor
Jacob R. Bresee

United States Patent Office.

JACOB R. BRESEÉ, OF MIDDLETOWN, NEW YORK.

Letters Patent No. 60,678, dated January 1, 1867.

---

IMPROVEMENT IN GATES.

---

The Schedule referred to in these Letters Patent and making part of the same.

---

TO ALL WHOM IT MAY CONCERN:

Be it known that I, JACOB R. BRESEÉ, of Middletown, in the county of Orange, and State of New York, have invented a new and useful Improvement in Gates; and I do hereby declare and make known that the following is a full, clear, and exact description of the same, reference being had to the accompanying drawings, and the letters and figures marked thereon, which form part of this specification.

The nature of my said invention consists in so constructing a gate of lattice-bars, pivoted together as shown, that said gate may be extended laterally when it is desired to close the same, and may be contracted or folded together so as to open the gate partially, or swung back upon a pivot when desired to completely open said gate, substantially as hereinafter more fully set forth and described.

To enable those skilled in the art to understand how to construct and use my invention, I will proceed to describe the same with particularity, making reference in so doing to the aforesaid drawings, in which—

Figure 1 represents a side view of my invention; and

Figure 2, a similar view, the gate being partially open, the dotted lines indicating the position of the same when fully opened.

Similar letters of reference in the different figures denote the same parts of my invention.

A represents the gate-posts, one of which, having one end of the gate permanently attached thereto, is provided with an opening entirely through the same, and the other having a recess marked F, into which the movable end of the gate enters when the gate is closed, thus securing the same firmly in place. B represents the gate, composed of diagonally-arranged strips or slats, pivoted together as shown, so as to be susceptible of being extended, as shown in fig. 1, or retracted, as shown in fig. 2. The gate is attached to the post A by means of the bar C, which is pivoted to said post at $c$, and the bar D, which is secured to C at $b$, by means of a pivot, its upper end being provided with a roller, $d$, which moves in diagonal guides in the interior faces of the slotted post A, as shown. When the gate is folded back, as shown in full lines in fig. 2, the bar D moves up to the upper end of the aforesaid guides, marked $a$, as shown in said fig. 2, when, by forcing the upper part of the gate back, the roller $d$ passes from said guide $a$ and allows the gate to lie back, as shown by the dotted lines at E. To close the gate, it is raised up sufficiently to allow the roller $d$ to enter the oblique slots $a$, when, by drawing the front edge of the gate towards the opposite post, it readily resumes the position and appearance shown in fig. 1. The gate may be constructed very cheaply of ordinary rough material, or it may be constructed of any ornamental and fanciful design and considerable expense, according to the taste or means of the owner.

Having described the construction and operation of my invention, I will now specify what I claim, and desire to secure by Letters Patent:

I claim attaching the gate B to the gate-post A, provided with a diagonal guide, as described, by means of the crossed bars C D, arranged and operating substantially as and for the purposes specified.

JACOB R. BRESEÉ.

Witnesses:
   W. E. MARRS,
   L. L. COBURN.